United States Patent [19]
Wilms et al.

[11] 3,822,096
[45] July 2, 1974

[54] METHOD AND APPARATUS FOR THE ENLARGED REPRESENTATION OF THE CROSS-SECTION OF NON-DESTRUCTED CONTACT LENSES OR THE LIKE

[75] Inventors: Karl-Heinz Wilms, Dachau; Gregor Henke, Maisach, both of Germany

[73] Assignee: Optische Werke G. Rodenstock, Munchen, Germany

[22] Filed: Aug. 1, 1972

[21] Appl. No.: 277,125

[52] U.S. Cl. .............. 356/164, 356/136, 356/124, 351/177
[51] Int. Cl. ............................................. G01b 9/08
[58] Field of Search ................ 356/164, 136, 124; 351/177

[56] References Cited
UNITED STATES PATENTS
2,500,051  3/1950  Wolfe ............................. 356/164
FOREIGN PATENTS OR APPLICATIONS
380,965  10/1964  Switzerland ..................... 356/164
1,277,360  10/1961  France ............................. 356/164
997,707  1/1952  France ............................. 356/163

OTHER PUBLICATIONS
"Micro Contact Lens Meas. & Insp. Instr." by NuStyle, The Optician.
"Contact Lens Combination, etc." by Weisser, pg. 251 Optometric Weekly Vol. 53, No. 6.

Primary Examiner—Ronald L. Wibert
Assistant Examiner—Paul K. Godwin
Attorney, Agent, or Firm—Craig and Antonelli

[57] ABSTRACT

A method and apparatus for the enlarged reproduction of the cross-section of non-destroyed contact lenses or the like with the aid of a projection apparatus that includes a light source, a condenser, a lens carrier, an objective and a projection surface as well as an immersion vessel arranged between the condenser and the objective, into which the contact lens to be reproduced is inserted; the immersion vessel is filled with a liquid having an index of refraction approximately that of the contact lens.

21 Claims, 4 Drawing Figures

PATENTED JUL 2 1974  3,822,096

METHOD AND APPARATUS FOR THE ENLARGED REPRESENTATION OF THE CROSS-SECTION OF NON-DESTRUCTED CONTACT LENSES OR THE LIKE

The present invention relates to a method for the enlarged representation of the cross-section of non-destructed contact lenses or the like with the aid of a projection apparatus consisting of a light source, condenser, lens carrier, objective and projection surface as well as to an apparatus for carrying out this method.

The measuring especially of the concave side of contact lenses offers in practice some difficulties since the contour of such contact lenses is composed for the most part of several circular portions as well as at times also of other curved shapes. The use of measuring gauges is therefore practically excluded for this reason.

Experiments to represent or reproduce contact lenses with the aid of conventional transmitted light or trans-illumination projections in a manner capable of meaningful measurements have not led to date to a satisfactory result.

It is the aim of the present invention to provide a method which permits the precise measuring of undestructed contact lenses with the aid of a clear, true-to-scale projection or screen image.

The underlying problems are solved according to the present invention in that the contact lens to be represented is arranged in the path of the rays between the condenser and the objective of a projection apparatus on the inside of an immersion vessel provided with clear transparent walls and filled with a liquid whose index of refraction is near that of the contact lens.

The contact lens may thereby be so arranged that its optical axis extends approximately at right angle to the path of the projection rays.

A side light may be additionally directed onto the contact lens disposed during the projection in the immersion vessel.

According to the method of the present invention an enlarged representation, true-to-scale, of the cross-section of the contact lens with sharp contours results on the projection surface or screen. This clear cross-sectional representation can be measured or compared completely satisfactorily with the aid of gauges, rules or templates. The rules, gauges or templates can be rigidly or displaceably connected with the projection surface by conventional means.

The apparatus for carrying out the method according to the present invention includes a light source, a condenser, an objective support and a projection surface. The lens carrier or support for the mounting of the contact lens to be represented is arranged on the inside of an immersion vessel which possesses clear transparent walls. The immersion vessel is filled with an immersion liquid whose index of refraction lies near that of the contact lens to be reproduced.

Only those walls of the immersion vessel may consist of clear transparent material which are disposed in the path of the rays of the projection.

In the actual apparatus the light source and the condenser can be arranged underneath the immersion vessel whereby the immersion vessel has a transparent bottom. The path of the projection rays which are directed from the bottom toward the top, can thereby be directed by way of one or several deflecting mirrors onto a projection surface that is disposed conveniently within the field of vision of the operating person.

The effect of the installation of the present invention is further improved if side light is directed onto the contact lens to be reproduced during the projection. An additional laterally arranged light source may serve for that purpose. However, a reflecting surface may also be arranged laterally of the contact lens to be represented within the path of the projection rays in such a manner that a portion of the light coming from the condenser is directed by means of this surface from the side onto the contact lens. The reflecting surface may be a mirror surface or also the surface of a prism.

With the use of a prism the latter may also serve for the accommodation and mounting of the contact lens in the immersion vessel. Similarly, a lens carrier or lens support of any known type may be arranged on such a prism.

The condenser of the apparatus may be constituted of two lenses or lens assemblies whereby the lens assembly adjacent the immersion vessel may be displaceably arranged with respect to the lens assembly adjacent the light source.

Accordingly, it is an object of the present invention to provide a method and apparatus for the enlarged representation of the cross-section of non-destructed contact lenses or the like which avoid by simple means the aforementioned shortcomings and drawbacks encountered in the prior art.

Another object of the present invention resides in a method and apparatus which permits an enlarged representation of the cross-section of non-destructed contact lenses by means of a projected image that is true to scale and clear, thereby permitting precise measurements thereof.

A further object of the present invention resides in a method and apparatus for the enlarged reproduction of the cross-section of a non-destroyed contact lens or the like which permits, by simple means, an accurate and precise measurement of the contact lens.

Still further object of the present invention resides in a method and apparatus for the enlarged representation of the cross-section of non-destroyed contact lenses or the like which is relatively simple in construction yet is completely satisfactory for its intended purposes.

These and other objects, features and advantages of the present invention will become more apparent from the following description when taken in connection with the accompanying drawing which shows, for purposes of illustration only, several embodiments in accordance with the present invention, and wherein.

Figure 1:
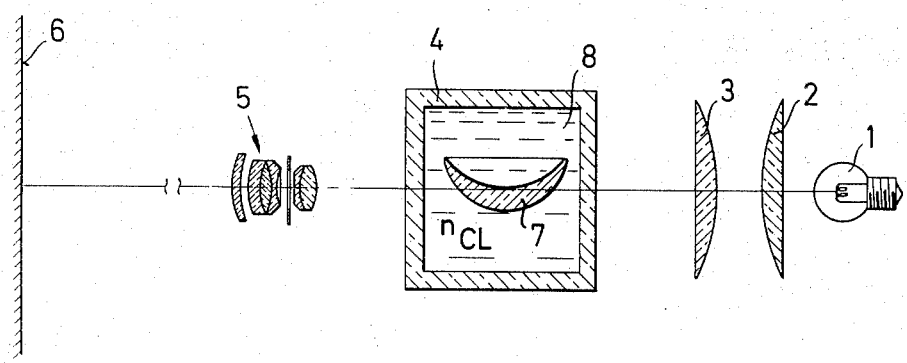
FIG. 1 is a schematic view of an apparatus in accordance with the present invention for carrying out the method in accordance with the present invention.

Referring now to the drawing, and more particularly to FIG. 1, an apparatus is illustrated in this figure which consists of a light source 1, in this case of a conventional incandescent lamp, of a condenser consisting of lenses 2 and 3, of an immersion vessel or tank 4 with clear transparent walls, of an objective or lens assembly 5 as well as of a projection surface 6. The contact lens 7 to be reproduced on an enlarged scale on the projection surface 6 is disposed on the inside of the immersion vessel 4 which is filled with a liquid 8 whose refraction is of refractionis at least similar to the index of refraction of the contact lens.

Figure 2A:
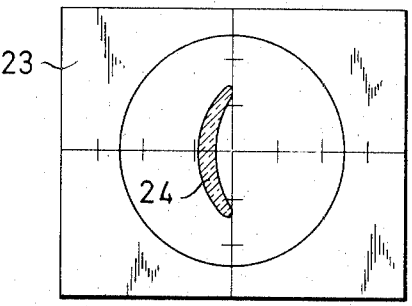
FIG. 2a is a view on the projection surface onto which the enlarged cross-section of the contact lens is projected with the apparatus in accordance with the present invention.
Figure 2:
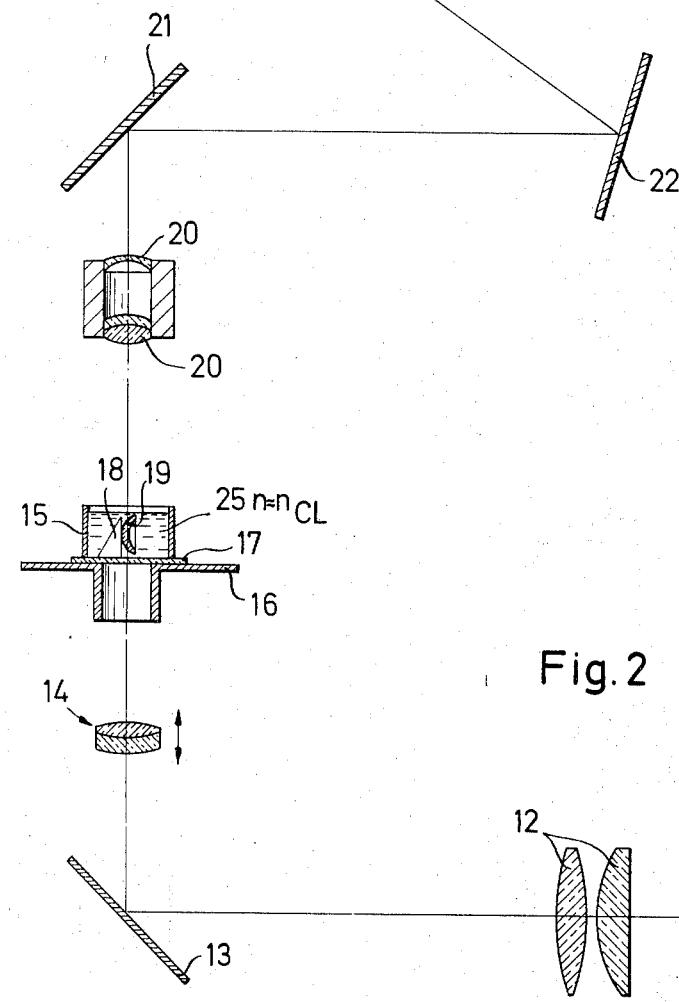
FIG. 2 is a schematic view of a modified apparatus in accordance with the present invention, illustrated in somewhat greater detail.

The apparatus illustated in FIG. 2 includes a conventional light source 11, which is followed by the first lens assembly 12 of the condenser. The path of rays which up to now was horizontal, is deflected upwardly by way of a deflection mirror 13 and is supplied to the second lens assembly 14 of the condenser. The double arrow associated with the lens assembly 14 thereby indicates that the lens assembly 14 of the condenser can be displaced in either direction by conventional means.

Above the lens assembly 14 is disposed the immersion vessel 15 which rests displaceably on a support table 16 and includes a clear transparent bottom 17. A lens carrier or support 18 retains the contact lens 19 to be represented. The path of the projected rays passes through the objective 20 and continues by way of deflection mirrors 21 and 22 onto the the projection or screen surface 23.

In FIG. 2a a view of the projection or screen surface 23 is illustrated whereby the contact lens 19 appears as enlarged cross-section 24.

Figure 3:
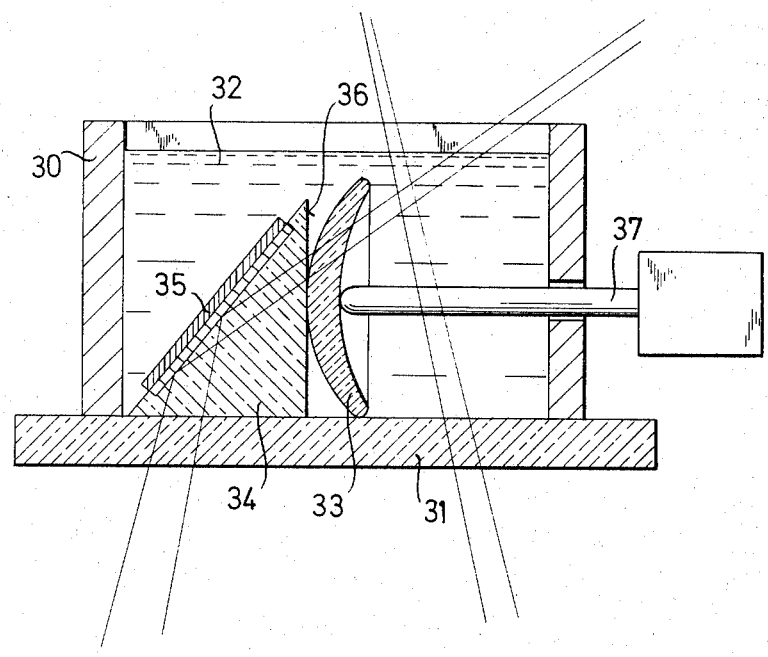
FIG. 3 is a cross-sectional view through an immersion vessel used with the apparatus in accordance with the present invention.

FIG. 3 illustrates an immersion vessel 30 on an enlarged scale which is provided with a clear transparent bottom 31. The immersion vessel or tank 30 is filled with a liquid 32 whose index of refraction is similar to that of the contact lens 33. A prism 34 is arranged adjacent the contact lens 33, whose surface 35 deflects a portion of the projected light beam coming from below and directs the same from the side onto the contact lens 33. The upright surface 36 of the prism 34 serves in connection with the displaceable retaining member 37 of conventional construction as lens carrier or support for the contact lens 33.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

What we claim is:

1. A method for the enlarged representation of the cross-section of undestroyed contact lenses or the like comprising the steps of:
    a. sequentially disposing, along a prescribed optical path, a condenser lens arrangement, a lens carrier, an objective lens arrangement and a projection surface;
    b. inserting a contact lens, a selected cross-sectional plane of which is to be represented on an enlarged scale, into said lens carrier, with said cross-sectional plane being disposed in the object plane of said objective lens arrangement; and
    c. directing light from a light source along said prescribed optical path;
    whereby the contour of said selected cross-sectional plane of said lens will be reproduced on an enlarged scale on said projection surface.

2. A method according to claim 1, wherein said lens is inserted into said lens carrier so that the axis of said lens extends at a right angle with respect to said prescribed optical path.

3. A method according to claim 2, wherein said lens carrier is an immersion vessel provided with transparent walls at least along those sides located in the direction of said prescribed optical path.

4. A method according to claim 3, further comprising the step of laterally illuminating said contact lens along a direction different from that of said prescribed optical path.

5. A method according to claim 1, further comprising the step of laterally illuminating said contact lens along a direction different from that of said prescribed optical path.

6. A method according to claim 3, characterized in that the immersion vessel is filled with a liquid having an index of refraction near that of the contact lens.

7. An apparatus for effecting an enlarged representation of the cross-section of undestroyed contact lenses or the like comprising:
    first means for providing a first beam of light along a prescribed optical path;
    a condenser lens arrangement, a lens carrier means, an objective lens arrangement and a projection surface disposed sequentially along said prescribed optical path; and
    wherein said lens carrier means includes means for disposing a contact lens, a selected cross-sectional plane of which is to be represented on an enlarged scale, at a prescribed position on said optical path so that said selected cross-sectional plane is located in the objective plane of said objective lense arrangement;
    whereby the contour of said selected cross-sectional plane of said lens is reproduced on an enlarged scale on said projection surface.

8. An apparatus according to claim 7, wherein said lens carrier means is an immersion vessel provided with transparent walls at least along those sides located in the direction of said prescribed optical path.

9. An apparatus according to claim 7, wherein said contact lens disposing means includes means for positioning said contact lens so that the axis of said lens extends at a right angle with respect to said prescribed optical path.

10. An apparatus according to claim 8, wherein said immersion vessel contains a liquid, the index of refraction of which is at least close to that of said contact lens, into which said lens is immersed.

11. An apparatus according to claim 10, wherein said contact lens disposing means includes means for positioning said contact lens so that the axis of said lens extends at a right angle with respect to said prescribed optical path.

12. An apparatus according to claim 8, wherein said first means and said condenser lens arrangement are arranged underneath said immersion vessel having a clear transparent bottom and wherein said apparatus further includes at least one deflection mirror disposed in said prescribed optical path for directing said first beam of light therealong and onto said projection surface.

13. An apparatus according to claim 8, wherein said immersion vessel further includes a reflecting surface means arranged at an angle with respect to said prescribed optical path for directing rays of light onto the surfaces of said lens laterally with respect to said prescribed optical path.

14. An apparatus according to claim 8, wherein the lens assembly of said condenser lens arrangement is displaceably disposed with respect to said immersion vessel.

15. An apparatus according to claim 8, characterized in that only the walls of the immersion vessel consist of clear transparent material which are disposed in said prescribed optical path.

16. An apparatus according to claim 13, characterized in that the reflecting surface means is formed by a prism which also serves as part of the lens carrier means.

17. An apparatus according to claim 12, wherein said immersion vessel further includes a reflecting surface means arranged at an angle with respect to said prescribed optical path for directing rays of light onto the surfaces of said lens laterally with respect to said prescribed optical path.

18. An apparatus according to claim 17, wherein the lens assembly of said condenser lens arrangement is displaceably disposed with respect to said immersion vessel.

19. An apparatus according to claim 18, wherein said contact lens disposing means includes means for positioning said contact lens so that the axis of said lens extends at a right angle with respect to said prescribed optical path.

20. An apparatus according to claim 19, characterized in that the reflecting surface means is formed by a prism which also serves as part of the lens carrier means.

21. An apparatus according to claim 20, characterized in that only the walls of the immersion vessel consist of clear transparent material which are disposed in said prescribed optical path.

* * * * *